United States Patent

Hörmann et al.

[11] Patent Number: 6,036,979
[45] Date of Patent: *Mar. 14, 2000

[54] MANUFACTURE OF SPREADABLE LOW-FAT CHEESE

[75] Inventors: Angela Hedwig Hörmann, Kempten; Klaus Mayer, Kleve; Helmuth Barthlomäus Kaindl, Neu-Ulm, all of Germany

[73] Assignee: Van den Bergh Foods Co., Division of Conopco, Inc., Lisle, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,990
[22] PCT Filed: Nov. 28, 1994
[86] PCT No.: PCT/EP94/03945
 § 371 Date: Aug. 5, 1996
 § 102(e) Date: Aug. 5, 1996
[87] PCT Pub. No.: WO95/14389
 PCT Pub. Date: Jun. 1, 1995

[30] Foreign Application Priority Data

Nov. 29, 1993 [EP] European Pat. Off. ............. 93203332

[51] Int. Cl.⁷ .................................................. A23C 9/12
[52] U.S. Cl. .............................. 426/36; 426/34; 426/38; 426/39; 426/40; 426/580; 426/582
[58] Field of Search .................... 426/34, 36, 38, 426/39, 40, 580, 582, 491

[56] References Cited

U.S. PATENT DOCUMENTS

| | | | |
|---|---|---|---|
| 3,929,892 | 12/1975 | Hynes et al. . | |
| 4,205,090 | 5/1980 | Maubois et al. .......................... | 426/40 |
| 4,980,179 | 12/1990 | Koenraads et al. ....................... | 426/36 |
| 5,252,352 | 10/1993 | Banach et al. ........................... | 426/580 |
| 5,916,608 | 6/1999 | Lanting et al. ........................... | 426/34 |

FOREIGN PATENT DOCUMENTS

| | | |
|---|---|---|
| 297 676 | 1/1989 | European Pat. Off. . |
| 623 204 | 7/1977 | Switzerland . |
| 91/02461 | 3/1991 | WIPO . |

OTHER PUBLICATIONS

Deutsche–Milchwirtschaft; 36 (33) 1034, 1036–1041.
Deutsche–Milchwirtschaft, 35 (44) 1790–1795.

*Primary Examiner*—Leslie Wong
*Attorney, Agent, or Firm*—Gerald J. McGowan, Jr.

[57] ABSTRACT

Method of manufacturing spreadable low fat fresh cheese devoid of non-dairy binding or structuring agents or added whey protein having a dry matter content of over 25% wt., a fat content of 0–10 and preferably 0–7% wt. on dry matter and a Stevens value in excess of 200 at 10° C.

3 Claims, No Drawings

MANUFACTURE OF SPREADABLE LOW-FAT CHEESE

This is a national stage filing of PCT/EP94/03945, filed Nov. 28, 1994.

BACKGROUND OF THE INVENTION

Several methods are known in the art for manufacturing low-fat fresh cheese and in the last decennia an ultrafiltration step for concentrating the cheese milk is usually applied, like the one described in Deutsche Milchwirtschaft 35 1790–1795 (1984) and 36 1034 1036–41 (1985). In practice the structure and rheology of the products are not quite satisfactory and cannot be fully remedied by adding fat or cream after the ultrafiltration step. Additionally attempts have been made to improve the rheology by the addition of binding or structuring agents, e.g. non dairy products such as gelatin, carrageenan, starches, as well as additional whey protein. In practice this resulted in organoleptic deterioration and/or an increase in ingredients to be declared.

It is an object of the invention to provide a low fat fresh cheese product having a spreadable character without using non-dairy binders or structuring agents or added whey protein. Of course this does not exclude the later addition of flavourants, herbs, spices, fruits, nuts, etc.

Another object of the invention is providing a simple process for manufacturing such a fresh cheese product. In this description and claims "low-fat" is used for 0–10 and preferably 0–7% wt. fat, calculated on total weight.

SUMMARY OF THE INVENTION

The invention provides thereto a spreadable low-fat fresh cheese devoid of non-dairy binding or structuring agents or added whey protein, prepared from an ultrafiltration or diafiltration retentate, having a dry matter content of over 25% wt. a fat content of 0–10 and preferably 0–7% wt. on total weight and a Stevens value in excess of 200 at 10° C.

A suitable process for manufacturing a fresh cheese of this type is by standardizing milk to the fat content as aimed at in the final product, subsequently adding an acidulant or an acidulating culture and a coagulating enzyme and allowing sufficient time for the pH to reach a value between 4.5 and 4.9 and preferably between 4.5 and 4.7 and the casein to curdle, thereafter heating the mixture to a temperature between 45 and 60° C., ultra-filtrating and/or diafiltrating the mixture to a dry matter content over 25% wt, then heating to a temperature between 65° C. and protein denaturing temperature, and preferably between 70 and 75° C. thereafter homogenising at a pressure between 10 and 40 MPa and finally filling into containers while keeping the product free of non-dairy binding or structuring agents or added whey protein.

EXAMPLES

Example 1

A preferred example of this process will be described for elucidation:

Skim milk is standardized with cream to a fat content of 1.7% wt. on total weight. After pasteurization an usual starter culture and rennet are added. This cheese milk is kept for 18 hours at 23° C. until the pH value is about 4.6. After a quick heat treatment at 48° C. the curdled cheese milk is ultrafiltrated until the solids content of the retentate is 28% wt. After addition of flavourants such as cooking salt the mixture is heated to 70° C. homogenized at 20 MPa and filled into 250 ml containers. After 2 days storage at 5° C. the Stevens value of the fresh cheese is 300 g, using a 12.7 mm cylinder at 1 mm/sec speed and a penetration depth of 20 mm when measured at 10° C.

Example 2

A more fresh taste can be obtained with only slightly modifying the rheology by adding 5–15% fresh yoghurt together with the cooking salt.

Example 3

Similar results are obtained when milk having a fat content 0.7% wt. is used as the only starting material, resulting in a fresh cheese having 4% wt. fat on total weight. The Stevens value of this product is 300 g at 10° C.

What is claimed is:

1. A process for the manufacturing of a spreadable low fat fresh cheese comprising over 25 wt. % dry matter, 0–10 wt. % fat and said fresh cheese 1) being devoid of non-dairy binding or structuring agents or added whey protein, with the proviso that yogurt may be added as flavorant,
   2) being prepared from an ultrafiltration or diafiltration retentate,
   3) having a Stevens value in excess of 200 g at 10° C., comprising the subsequent steps of:
      a) standardizing milk to the fat content as aimed at in the final product,
      b) subsequently adding an acidulant or an acidulating culture and a coagulating enzyme,
      c) allowing sufficient time for the pH to reach a value between 4.5 and 4.9 and the casein to curdle,
      d) heating the mixture to a temperature between 45 and 60° C.,
      e) subjecting said mixture to a treatment selected from the group of ultrafiltration, diafiltration or combinations thereof, to a dry matter content over 25 wt. %,
      f) heating to a temperature between 65° C. and protein denaturing temperature,
      g) thereafter homogenizing at a pressure between 10 and 40 Mpa, and
      h) finally filling into containers while keeping the product free of non dairy binding or structuring agents or added whey protein.

2. The process according to claim 1 wherein the cheese comprises 0–7 wt. % fat.

3. The process according to claim 1 wherein in step (f) heating is applied to a temperature of between 70 and 75° C.

* * * * *